Feb. 12, 1957 E. TIGER 2,781,019

CONTINUOUS MAGNETIC TAPE AND CARTRIDGE

Filed Jan. 12, 1956

Inventor
Emil Tiger
By Silverman + Mullin
attorneys 2,781,019

CONTINUOUS MAGNETIC TAPE AND CARTRIDGE

Emil Tiger, Skokie, Ill., assignor to Sound, Inc., Chicago, Ill.

Application January 12, 1956, Serial No. 558,762
4 Claims. (Cl. 116—124)

This invention relates generally to tape recording devices and more particularly, relates to a novel continuous magnetic tape and cartridge for use in such devices which enables both a very accurate cataloging and subsequent identification and selection of particular subject matter recorded on any given portion of the tape for purposes of playback.

The principles of the invention are especially useful in connection with magnetic tapes of the continuous type wound on the spool of a molded synthetic plastic cartridge and where the tape has different subject matter recorded either on one surface or both surfaces thereof. Such cartridges provide distinctive advantages, especially automatic positioning of the tape properly for recording or playback in the recording device merely by mounting the cartridge on device. However, for the reason that the tape is wound upon itself in the cartridge, it has been practically impossible for the operator positively to identify and select specific portions of the tape on which certain desired subject matter has been recorded for purposes of playback without random playback of even the entire tape until the proper portion of the tape is located. The problem is complicated manyfold where both surfaces of the magnetic tape have recorded matter thereon, the effective length of the tape in this case being twice its physical length.

Accordingly, it is a principal object of this invention to provide a novel continuous magnetic tape and cartridge which enables a very accurate identification and selection of any given portion of the tape for purposes of playback of a desired recording in a manner substantially eliminating the disadvantages hereinabove enumerated.

Another object of the invention is to provide a magnetic tape and cartridge of the character described in which the tape and cartridge have novel cooperating identification and selection means for enabling the operator accurately and positively to select any predetermined portion of the tape for purposes of playback of any desired subject matter recorded on the tape.

Another important object of the invention is to provide a cartridge of the character described having novel means for cataloging the specific subject matter recorded on the tape so as to enable subsequent identification and selection of any desired recorded matter without the necessity of playback.

These and other objects of the invention will become apparent as the description thereof proceeds, in connection with which a preferred embodiment has been described in the specification hereof and illustrated in the accompanying drawings so as to enable the skilled artisan to understand and practice the invention as contemplated by the patent statute. Minor variations in the size, arrangement, proportion and construction in the several parts of the invention are contemplated without sacrificing any of the advantages or departing from the basic principles of the invention.

Figures 1, 4:
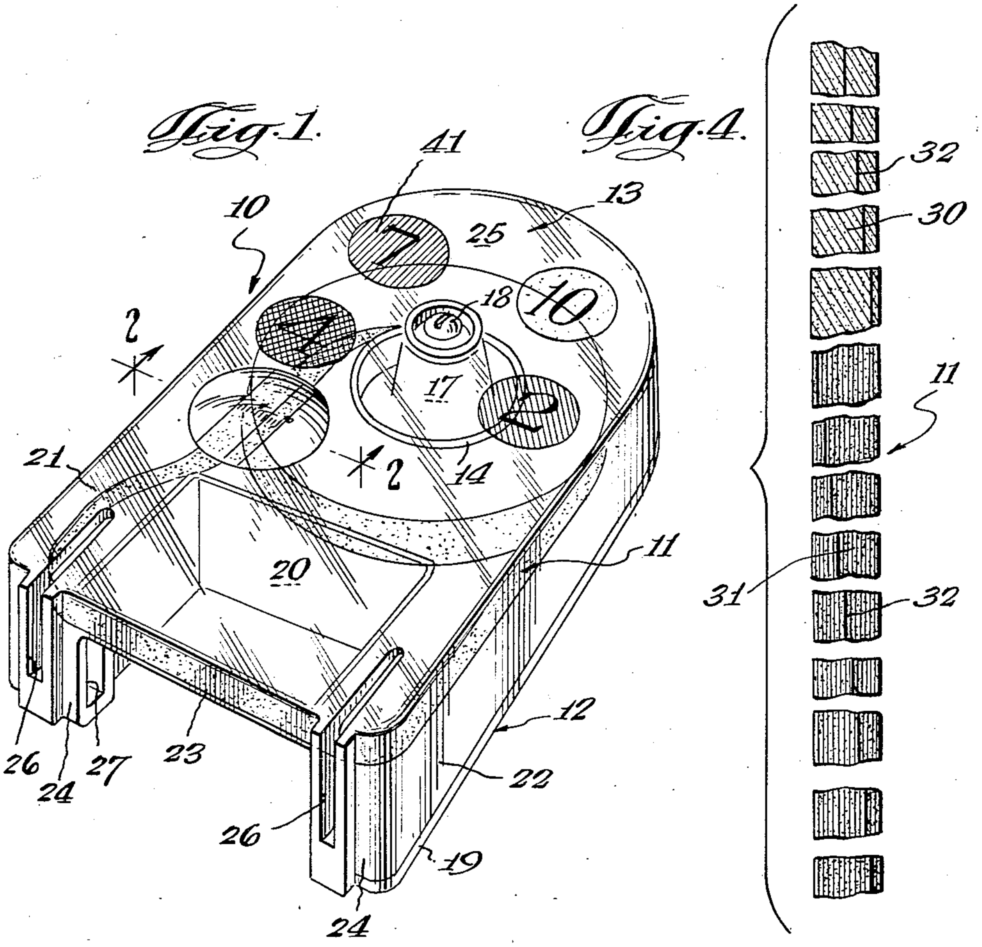
Fig. 1 is a perspective view of a cartridge and magnetic tape wound therein, all in accordance with the herein invention.
Fig. 4 is a plan view of a length of the magnetic tape showing the identification means provided thereon.

Generally, the invention may be employed with any kind of cartridge in which a continuous magnetic tape is wound, the tape being automatically properly positioned for recording thereon or playback in the recording machine merely upon installation of the cartridge. A representative cartridge has been illustrated in Fig. 1 and designated generally by the reference character 10 and the continuous magnetic tape wound in the cartridge has been designated generally 11. Such cartridges may be molded from any of many suitable synthetic plastic resins to provide a tray 12 and a cover member 13 capable of being cooperatively secured together to form the completed unit. In the embodiment illustrated, both the tray and cover have been molded from transparent plastic material, however, for purposes of this invention, it is desired at least a portion of the cover 13 be transparent. The general configuration of the cartridge may vary considerably, but in the completed form thereof there is desired to be provided an internal compartment for storage of the tape, and a pair of spaced apart internal chambers of elongate formation between which the tape is led past the head of the recording device. Said internal compartment has a spool 14 integral with the tray 12 on which the tape 11 is wound and a shelf 15 integral with the spool for supporting the tape above the base 16 of the tray part. The base 16 also has an upstanding boss formation 17 concentric with spool 14 by means of which the cover 13 may be secured over the tray such as by fastener 18 screw threaded through the cover into said boss.

To provide the spaced apart internal chambers, one end of base 16 may be bifurcated to provide a pair of legs, one of which is seen at 19, and a continuous upstanding wall 20 formed integral with the base extending on the interior of the bifurcated portion from the inside corners respectively of the forward ends of the legs 19. Said internal chambers have been designated 21, 22 and will be seen to communicate with the internal compartment in which the tape is wound. Said chambers 21 and 22 further are connected by means of a pair of spaced apart narrow webs, of which one is visible at 23, which define a channel through which the tape is led from one chamber 21 to the other chamber 22. The chambers 21 and 22 are each closed at the forward end thereof by a wall 24 depending from the planar wall 25 of said cover and having an upwardly opening slot 26 therethrough connecting with a said internal chamber. Immediately behind each slot in a said internal chamber is usually provided a reciprocable platform (not shown) on which the tape is supported during non-use thereof to be positioned in said connecting channel. When the cartridge is installed on the recording device, a suitable finger is provided on the device which engages through each slot 26 with said platform and moves same to a lowered position exposing the tape for movement past the head of the recorder. A slot 27 is provided in wall 20 adjacent each wall 24 to permit the tape to be lowered to its exposed position. This is all known and does not form part of the invention. For that reason, many variations in the structure described heretofore are deemed possible.

As shown in Fig. 1, the tape 11 is wound on spool 14 and may have subject matter recorded either on one surface or both surfaces thereof. Since the major portion of the tape is wound on said spool, it is impossible to ascertain which portion of the tape has certain desired subject matter recorded thereon. The usual practice heretofore has been to play back the tape until the particular portion having a certain recording desired to be played back is reached and then to make proper adjustments for playing back this recording. This invention succeeds in eliminating such haphazard identification and selection of proper portions of the tape for playback purposes. The invention provides identification means on the tape 11 and selection means on the cartridge which cooperate to enable the operator immediately and accurately to locate the particular portion of the magnetic tape desired to be played back. We consider first magnetic tape 11, it being understood that the identification means may be afforded on either or both surfaces thereof. The entire length of the tape 11 is marked off into sectors of predetermined equal length; the precise length chosen for each sector may vary within wide limits. For illustrative purposes, two such sectors 30 and 31 are shown in Fig. 4, each sector being distinguishable one from the other by means of distinctive indicia. For instance, each sector may be colored differently or may be marked with distinctive cross-hatching. This construction is adhered to for each of the sectors marked off on a recording surface of the magnetic tape 11. In addition, each sector is provided with a continuous straight line 32 which extends from one corner at the point of commencement of said sector diagonally across to the opposite corner at the point of termination of said sector. As seen in Fig. 4, the sectors 30 and 31 have been broken at intermittent points along the length thereof to indicate the continuity of the tape 11, and the line 32 for each sector may be seen extending from opposite corners of the sector.

Cooperating with the identification means is the novel selection means provided on the cartridge. The top planar wall 25 is provided with a scale 33, the length of which is substantially equal to the width of the tape 11. The scale 33 may be etched or imprinted in the upper or lower surface of said wall 25 and is located on said wall 25 to be traversed by said tape as it is fed past the head of the recording device. It is desired that the tape 11 be led across the scale 33 in a plane parallel to the plane of said wall 25. This is accomplished by means of a restricted path or throat provided in the cartridge.

Figure 2:
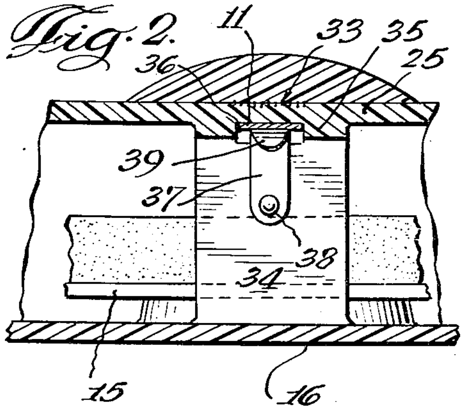
Fig. 2 is a sectional view taken through said cartridge along the line 2—2 of Fig. 1 and in the direction indicated.

Referring to Fig. 2, an upstanding lug 34 may be formed integral with base 16 at a location opposite scale 33 on the cover 10. The cover 10 may be formed with a depending thickened formation 35 which will be aligned with lug 34 when the cover is positioned on said tray. The lug 34 and the formation 35 are each slotted or notched at their forward extremity to provide a passageway or throat 36 the dimension of which is sufficient to accommodate the width of the tape 11. Situated in said throat or passageway 36 may be a leaf spring 37 secured at one end to said lug 34 by a fastener such as rivet 38 with the opposite end curved as shown at 39 and engaged against the bottom of the tape. The tape 11 traverses passageway 36 between said spring 37 and wall 25, the spring being under strain biasing the tape into a flattened position so that it traverses the scale 33 in a plane parallel to the plane of said wall 25.

Figure 3:
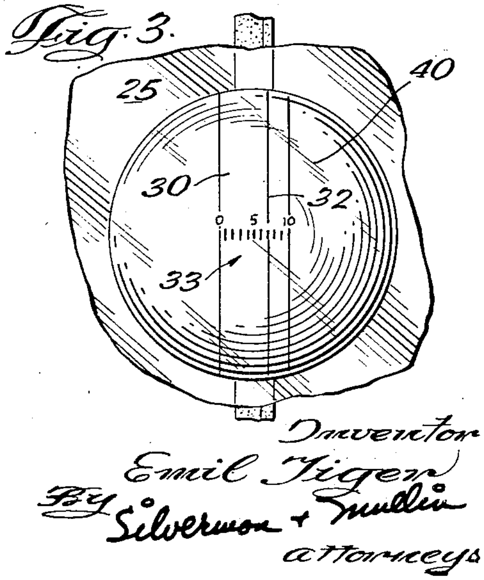
Fig. 3 is a top plan view of the sighting means provided on the cartridge for use with the novel identification and selection means of the invention.

Referring to Fig. 3, I may provide a sighting device 40 for magnifying the scale 33 and the portions of the tape positioned beneath said scale. This device may be a magnifying glass installed in a window in the wall 25 over the scale 33 or may be molded directly with the cover 10. Various other means for providing such a magnifying sighting member are feasible all within the scope of the invention.

We consider now the manner of achieving the advantages of the invention by means of the construction described. Assume that the cartridge has been installed on the recording device and the operator desires to record certain subject matter on the tape. The tape has been marked off with distinguishable sectors each one hundred feet in length for example. The scale 33 has been calibrated into 10 equal units. For illustrative purposes, the sector 30 has been shown traversing scale 33 in Fig. 3. The operator notes by the distinctive indicia, such as the color of the tape, that sector 30 is located beneath the scale 33. Also, it will be noted that the line 32 coincides with a particular unit of the scale, in this case, 7/10 of the scale. The operator knows immediately that he will commence recording on a portion of the tape identified by the distinctive indicia of sector 30 and a point 7/10 of its length or 70 feet thereof. As the recording is finished, he may note by means of the scale 33 and the location line 32 of the specific sector of the tape on said scale the exact location on the tape where this took place.

Thus, when it is desired to play back the particular recording on sector 30 commencing at a point 70 feet from the beginning of said sector, the operator need only position the tape with respect to the scale 33 to locate this precise point on the tape and commence playback. This can be done at high speed wind or rewind. This procedure may be duplicated for recording and playback of any desired subject matter.

To assist the operator in cataloging various subject matter on the tape, the cover 10 may be provided with a plurality of areas such as area 41 shown in Fig. 1. The area 41 has the same distinctive indicia employed to distinguish the sectors on the tape and the same number of areas may be provided as are sectors on a single recording surface of the tape. Thus, area 41 may have the same identifying indicia as sector 30 and the operator need only mark on this area the numeral "7" indicating that the specific recording was made on sector 30 commencing at unit "7" on the scale 33. Also, the operator may note alongside area 41 the particular recording made, as by a label or pencil.

It will thus be seen that I have provided a novel magnetic tape and cartridge having cooperating identification and selection means which enable very accurate and speedy determination of the particular portion of the magnetic tape on which a desired subject matter has been recorded and repositioning said portion for subsequent playback. The restricted passageway or throat 36 and its biasing spring 37 insure passage of the tape across the scale 33 in a plane parallel to the plane of the cover of the cartridge so that easy determinations may be made. The passageway 36 and spring 37 may be varied in construction, it being desired only to achieve this flat passage of the tape over the scale 33. Thus the spring may be eliminated, if the throat is narrow enough, or the lug 34 may be eliminated and a suitable groove and spring mounted to the bottom of the cover.

It is believed that the invention has been described in sufficient detail to enable a complete understanding thereof. In construing the scope of the invention, it is desired to avoid being limited unnecessarily by the specific details of construction described, but rather, to be afforded the benefit of the broad principles of the invention as set forth in the claims hereto appended.

What it is desired to secure by Letters Patent of the United States is:

1. A cartridge and continuous magnetic tape wound therein for use with a tape recording device, said tape having a recording surface thereof divided into separately distinguishable sectors of substantially equal lengths, each sector having identification means extending continuously between points of commencement and termination of the sector along the length of the tape, said cartridge having selection means cooperating with said identification means which enable accurate determination of the particular portion of the length of said tape on which specific subject matter is recorded and thereafter, accurate location and positioning of said portion with respect to the head of the recording device for purposes of playback, said cartridge having a restricted passageway along which the tape is led to traverse said selection means with said recording surface parallel to the face of the cartridge.

2. A combination as described in claim 1 in which there are spring means mounted on said cartridge and arranged to bias a part of said tape into predetermined planar position relative said scale and to hold same while the tape is moving past said scale.

3. The combination as described in claim 1 in which said selection means comprises a scale on the cartridge arranged to be traversed by said identification means, said scale being calibrated to indicate fractional lengths of each sector when said identification means register with the calibrations of the scale, said cartridge having magnifying sighting means overlying said scale and a cataloging window for each of said sectors, there being a window and a sector having the identical distinguishing characteristics.

4. A cartridge and continuous magnetic tape wound therein for use with a recording device, said cartridge comprising a tray and a cover cooperatively assembled together, said cover having a window therein beneath which the tape is movable, a selector scale situated in said window, said tape being divided into separately distinguishable sectors along the length of a recording surface thereof, each sector having a straight line of indicia extending diagonally from a point of commencement to a point of termination of the sector capable of registering with the calibrations of the scale as the tape is moved to determine fractional lengths of a said sector on which recordings have been made and enable accurate relocation of such lengths of the sector relative to the head of the recording device when the cartridge is installed thereon for purposes of playing back any desired recording, said scale being calibrated in equal fractional units of width of the tape, the line being arranged to traverse the scale transverse of the line of movement of the tape past the scale to enable identification of the amount of tape that has passed by the position of the line upon said scale, said cartridge having a restricted throat formation along which the tape is led past the scale, said tape being removably disposed in said formation when said cartridge is assembled, and means secured to the cartridge in engagement with the tape to maintain same parallel to and pressed against the underside of the window as it is led past.

References Cited in the file of this patent

UNITED STATES PATENTS

| | | |
|---|---|---|
| 2,484,248 | Roehrl | Oct. 11, 1949 |
| 2,551,198 | Barrett | May 1, 1951 |
| 2,761,351 | Gehring | Sept. 4, 1956 |